UNITED STATES PATENT OFFICE.

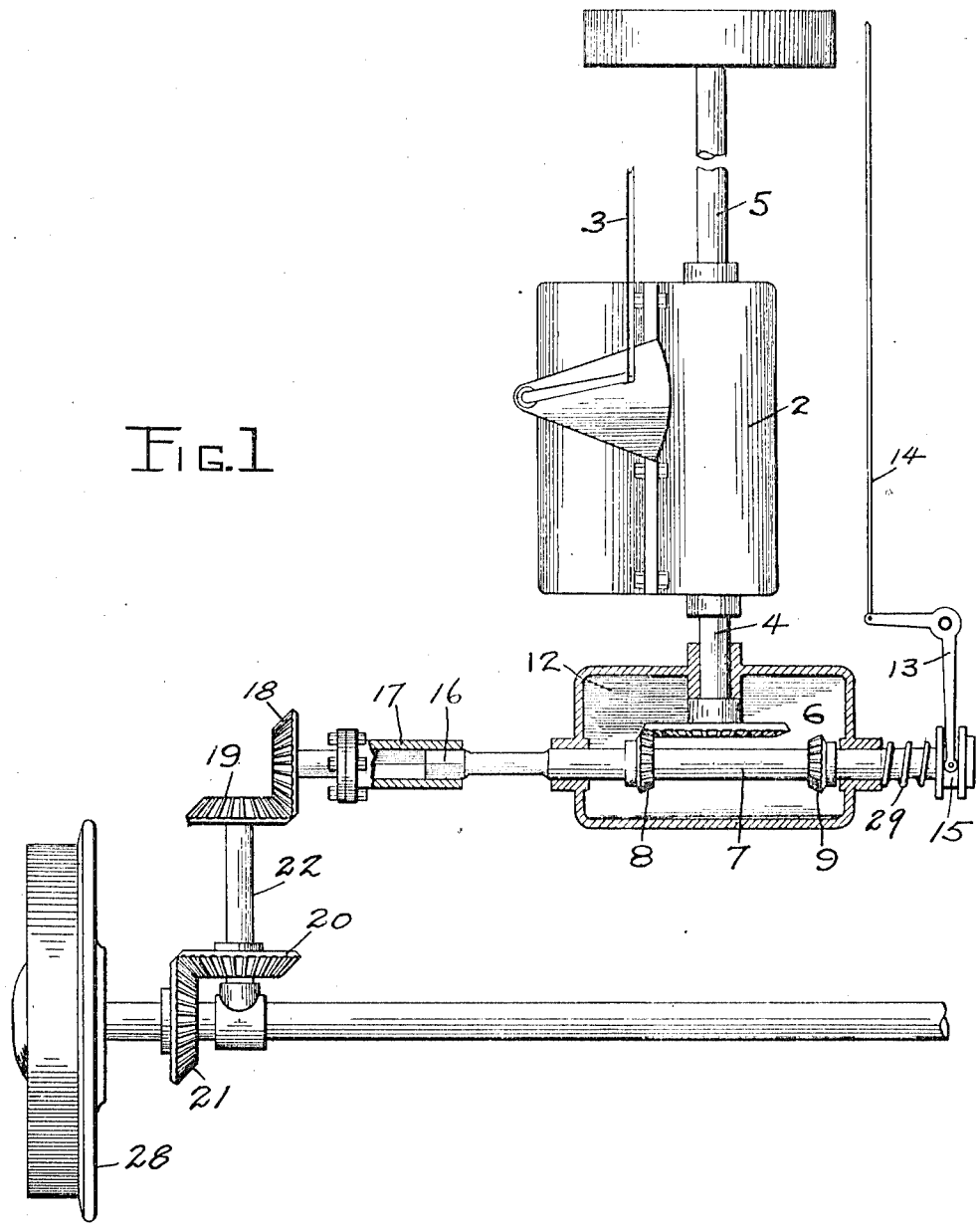

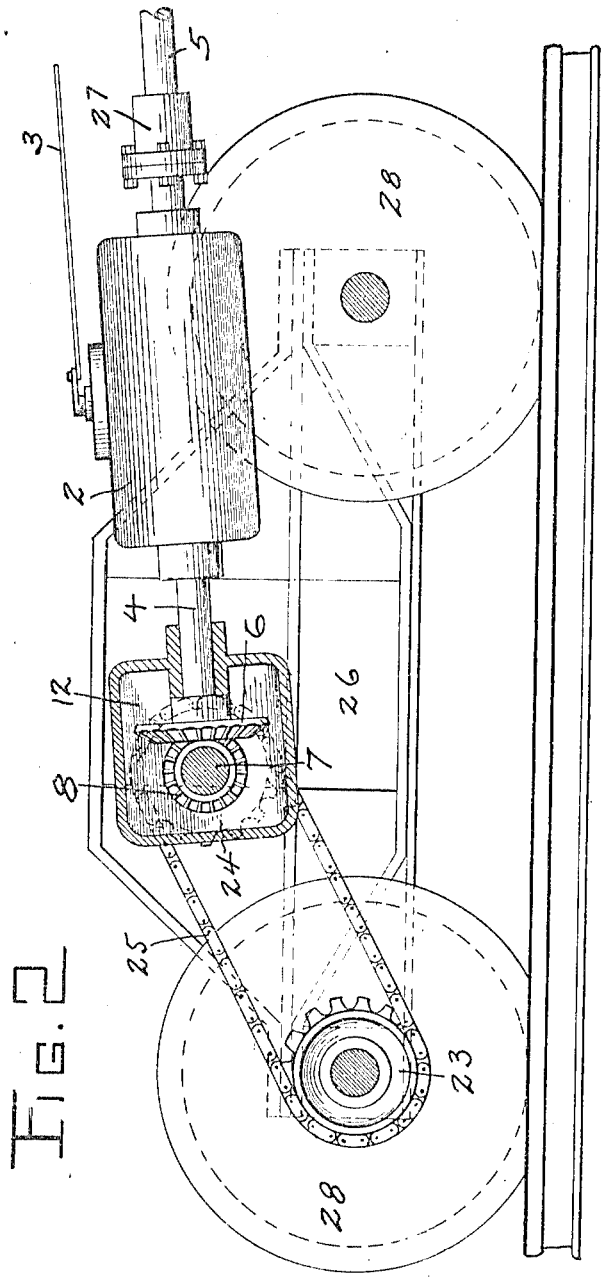

ELBERT J. HALL, OF WEST BERKELEY, CALIFORNIA.

TRANSMISSION MECHANISM.

1,063,874.      Specification of Letters Patent.      Patented June 3, 1913.

Application filed April 22, 1911. Serial No. 622,643.

*To all whom it may concern:*

Be it known that I, ELBERT J. HALL, a citizen of the United States, and a resident of the city of West Berkeley and State of California, have invented certain new and useful Improvements in Transmission Mechanism, of which the following is a specification.

The invention relates to improvements in transmission and reversing mechanism adapted to vary the speed and direction of rotation of the apparatus to be driven independently of the speed of rotation of the source of power.

The invention is particularly applicable to self-propelled vehicles wherein it is desirable to regulate and control the speed and direction of motion of the vehicle independently of the speed or direction of rotation of the motor or engine.

The object of this invention is to provide a mechanism whereby the vehicle or apparatus may be operated at various speeds in either direction with one set of transmission or change speed gears, adapted by their construction to give variable speeds in one direction.

Heretofore in the construction of self-propelled vehicles the transmission gear set has been arranged to give several speeds in one direction and only one speed in the reverse direction. This arrangement has been caused by the multiplicity of parts which, under the general arrangement now in use, would enter into a mechanism for producing the same variation in speed in the reverse as in the forward direction. In the present invention, however, I obtain with one transmission gear set the same variations in speed in the reverse direction as are obtainable in the forward direction.

The invention is particularly adapted for use in combination with self-propelled railway motor cars, which cars must generally travel in either direction due to the lack of turning facilities at the end of the run. It is desirable, therefore, that the same variations in speed may be obtainable, regardless of which end of the car is the forward end.

To these objects the invention consists of a transmission gear connected to a reversing mechanism, so that the same number of speeds may be obtained in either direction.

The apparatus possesses other advantageous features which, with the foregoing, will be set forth at length in the following description, where I shall outline in full that form or embodiment of the invention herein selected for illustration in the drawings accompanying and forming part of the present specification. From this it will be apparent that I do not restrict myself to the showing made by such drawings and description, as many changes could be made without varying from the scope or spirit of the invention.

Figure 1 is a top or plan view of the apparatus of my invention, partly in section; the mechanism being arranged to operate on the axle of a vehicle. Fig. 2 is a vertical cross section of a modification of the invention, mounted upon a railway car truck.

The transmission gear set, which may be of any construction to give variable speeds in one direction, is inclosed in the gear-box 2, and is provided with a rod 3 for shifting the gears to vary the speed of the driven shaft 4. The drive-shaft 5 enters the gear-box 2 at the opposite end and extends forward to the engine or motor. A bevel gear 6 on the driven shaft 4 transfers the power to a transverse shaft 7 by means of the bevel gears 8—9 secured to the shaft. The gears 6, 8 and 9 are preferably arranged in a casing 12 which is filled with oil or other lubricating material to facilitate the operation of the gears. The shaft 7 is journaled in the case 12 and is arranged to be slidable therein to cause either gear 8 or 9 to mesh with the gear 6 on the drive shaft 4. Any suitable means may be employed for shifting the shaft 7, and in the present instance I have shown a bell-crank 13, operative by the rod 14 and engaging a grooved collar 15 on the shaft. A spring 29 is interposed between the case 12 and the collar 15 to facilitate the operation of the bell-crank 13. The opposite end of the shaft 7 is formed square or rectangular in cross-section as shown at 16, and is arranged to slip longitudinally in a correspondingly formed hollow sleeve 17 as the shaft 7 is moved longitudinally. The end 16 of the shaft is always seated in the sleeve 17 so that all rotary motion thereof is positively transferred to the sleeve.

Suitable means are employed for transferring the rotary motion of the sleeve to the axle of the vehicle. In Fig. 1 I have shown a train of gears 18—19—20—21 and a counter-shaft 22 for transferring such motion, and in Fig. 2 I have shown another means embodying the sprocket wheels 23—

24 and the drive chain 25, either of which can be used with equal efficiency. The wheels 28 are rigidly attached to the axle of the vehicle and revolve therewith when power is applied.

When the transmission and reversing mechanism is mounted on the vehicle truck 26, as shown in Fig. 2, it may be desirable to include a universal joint 27 in the shaft 5 to relieve the shaft of any bending strain due to the truck being thrown out of alinement when the vehicle is passing over a curve in the roadway. In the adaptation of the device to vehicles wherein the axle of the drive wheels is rigidly attached to the vehicle body, this may be eliminated.

It is to be understood that I do not limit myself to the exact construction and arrangement of parts as set forth, as many changes could be made, depending on the application of the mechanism, without varying from the scope or spirit of my invention.

I claim:

1. In a power propelled vehicle, a driven shaft, a casing, a longitudinally arranged drive shaft journaled in said casing, a bevel gear on the drive shaft within said casing, a transverse shaft parallel to said driven shaft journaled in the casing and slidable therein, oppositely arranged bevel gears mounted on said transverse shaft within the casing, means for moving said transverse shaft to bring either of said gears into mesh with the first mentioned gear, and means connecting said transverse shaft with the driven shaft.

2. In a power propelled vehicle, the combination of a driven shaft, a casing, a longitudinally arranged shaft bearing in said casing, a bevel gear on said shaft within the casing, a transverse shaft bearing in the casing and slidable therein, oppositely arranged bevel gears on said transverse shaft adapted to singly engage the first mentioned gear on opposite sides thereof, means for longitudinally moving said transverse shaft, connections between said transverse shaft and the driven shaft and a slip joint between said shaft and said connections.

ELBERT J. HALL.

Witnesses:
H. G. Prost,
N. B. Heine.